FIG. I.

United States Patent Office 3,425,905
Patented Feb. 4, 1969

3,425,905
NUCLEAR REACTORS
Frank Geoffrey Greenhalgh, and Walter John Cairns, Culcheth, Warrington, England, assignors to United Kingdom Atomic Energy Authority, London, England
Filed July 18, 1966, Ser. No. 566,062
Claims priority, application Great Britain, July 22, 1965, 31,222/65; Jan. 13, 1966, 1,739/66
U.S. Cl. 176—50
Int. Cl. G21c 19/06, 19/28
5 Claims

ABSTRACT OF THE DISCLOSURE

A nuclear reactor having a fuel assembly suspended within a vertical tube, the lower end of the assembly being freely encircled by a collar in contact with the tube; limited clearance between the lower end of the assembly and the collar enables the lower end to vibrate, but prevents the assembly contacting and damaging the tube.

---

This invention relates to nuclear reactors of the kind in which vertical tubes are provided, hereinafter termed pressure tubes, for containing nuclear fuel assemblies and for conducting coolant flow therealong in heat exchange with the nuclear fuel assemblies.

An example of a nuclear reactor of this kind is broadly described in Nuclear Engineering of February 1964. In that reactor a heavy water moderator is contained in a calandria tank penetrated by vertical pressure tubes. Nuclear fuel, comprising clusters of parallel rods, is suspended within the pressure tubes and is immersed in upwardly flowing water which is boiled in heat exchange with the fuel. Because of the requirement for neutron economy in the core of such a reactor, the core portions of the pressure tubes are of zirconium alloy and have small wall thickness (e.g. 0.2" thick) and to prevent fracture occurring due to the pressure of the coolant (950 lb./sq. in.) mechanical damage to the tubes during operation should be avoided. Damage to a pressure tube can result from vibrational contact between the pressure tube and the fuel assembly caused by coolant flow.

According to the invention, in a nuclear reactor having vertical pressure tubes for conducting fluid flow there is a resiliently contractible collar in at least one of said pressure tubes, the peripheral surface being in unattached contact with the wall of said tube; a fuel assembly, housed in said tube with a radial clearance between said assembly and said tube, is supported against gravity at one end and is free at the other, the free end being encircled by said collar with a radial clearance between the assembly and the collar; and said clearance between said assembly and said pressure tube is greater than the clearance between said assembly and said collar so that, although the free end of the assembly has substantial freedom of movement, the assembly is prevented from contacting the wall of the pressure tube.

The invention also includes a fuel assembly for a nuclear reactor according to the preceding paragraph, wherein said collar is a ring which is split at one circumferential part and is carried by said free end of said assembly.

Figure 1:
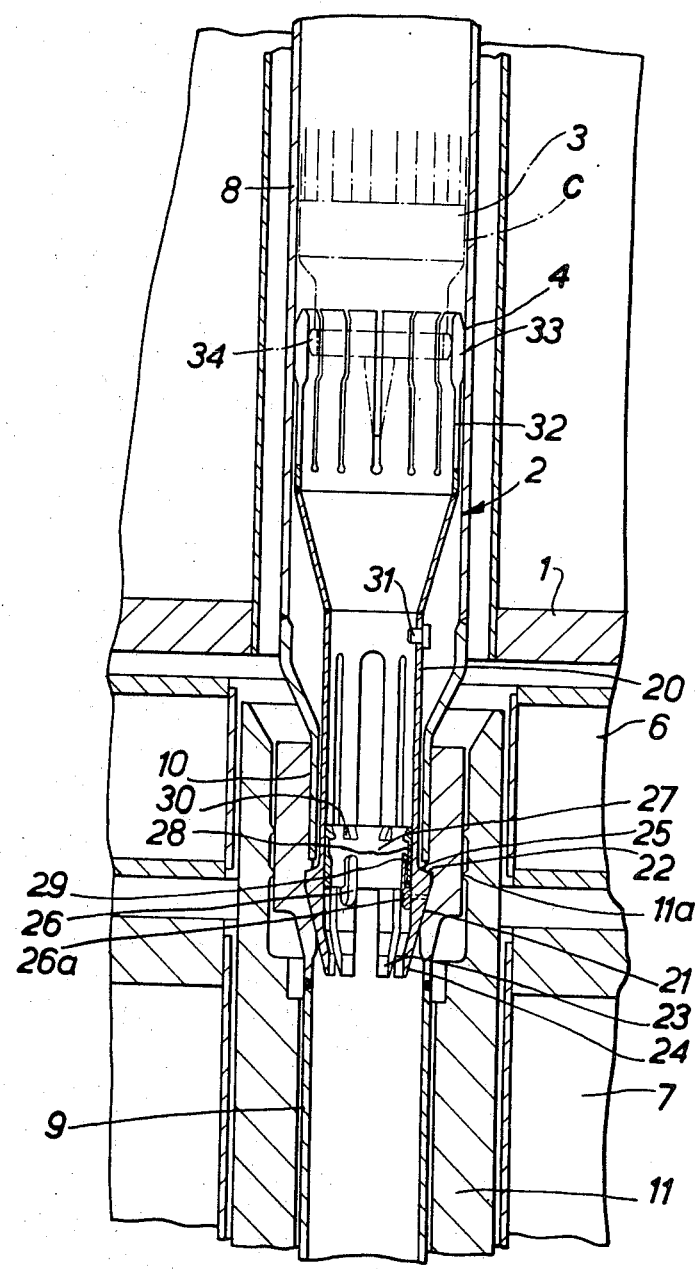
Figure 2:
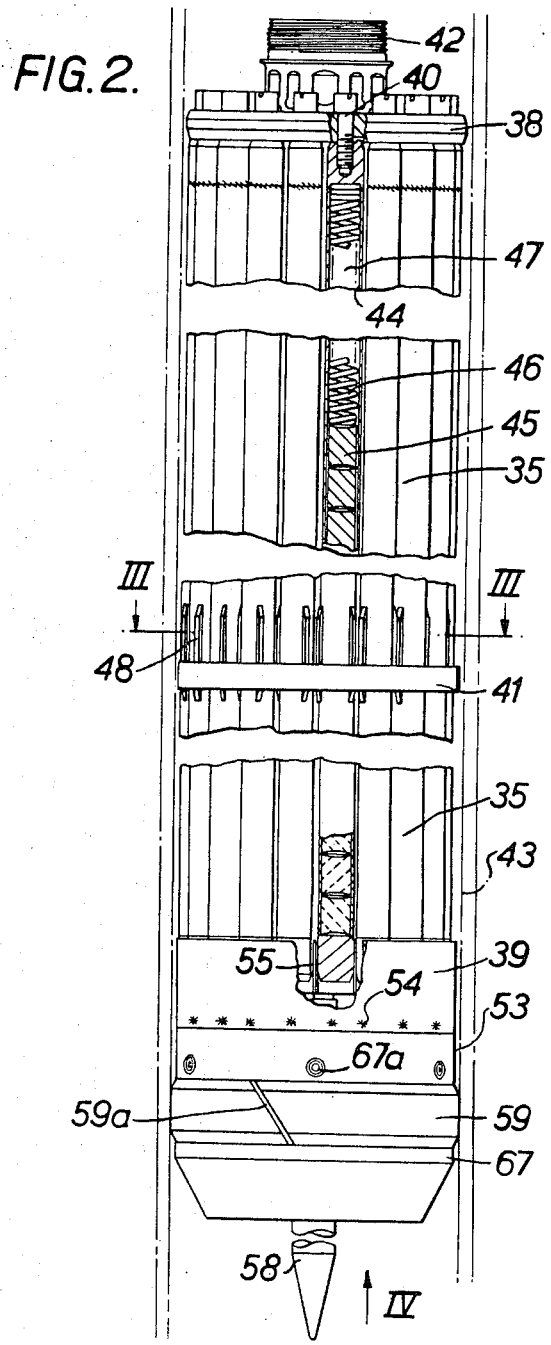
Figure 3:
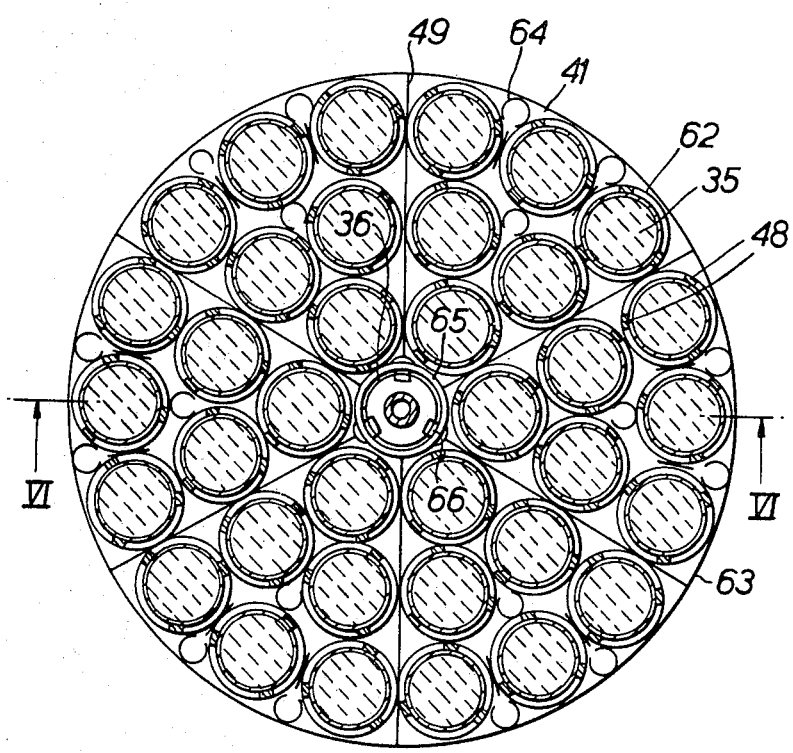
Figure 4:
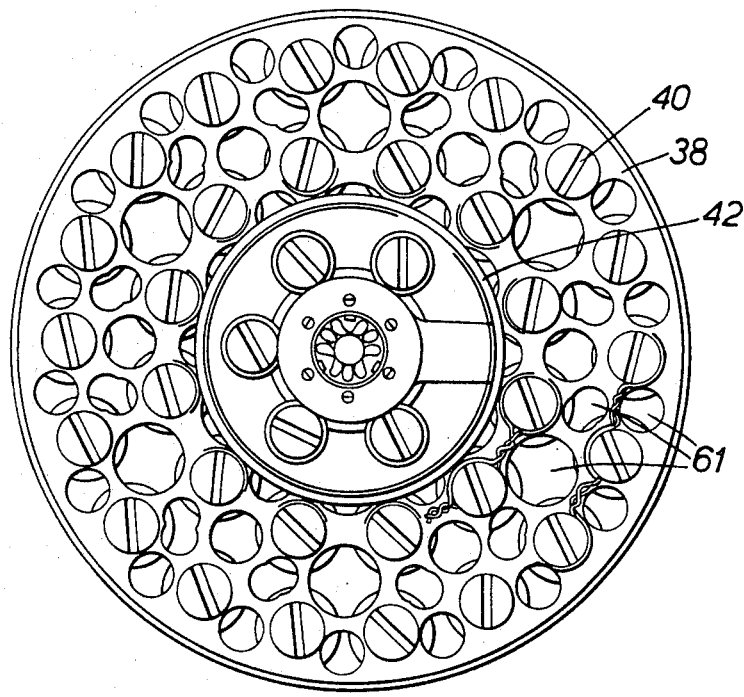
Figure 5:
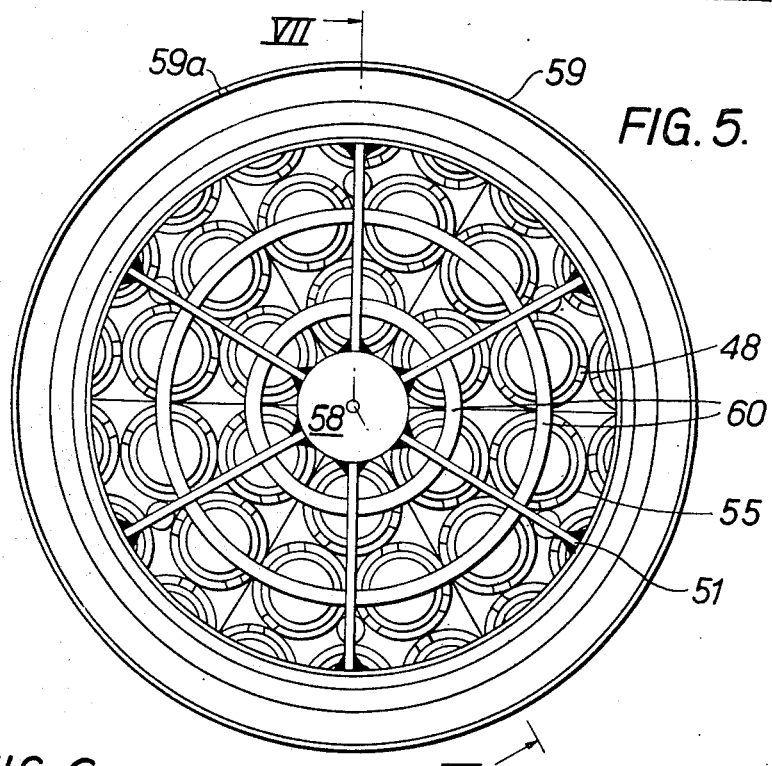
Figure 6:
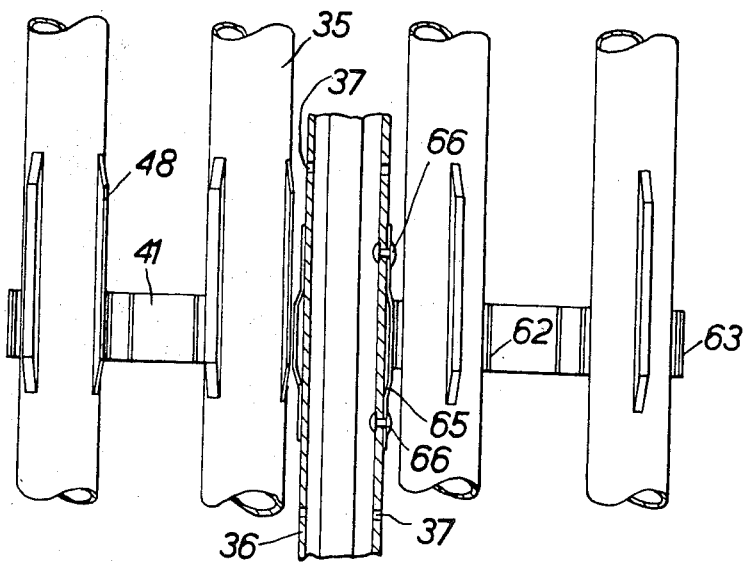
Figure 7:
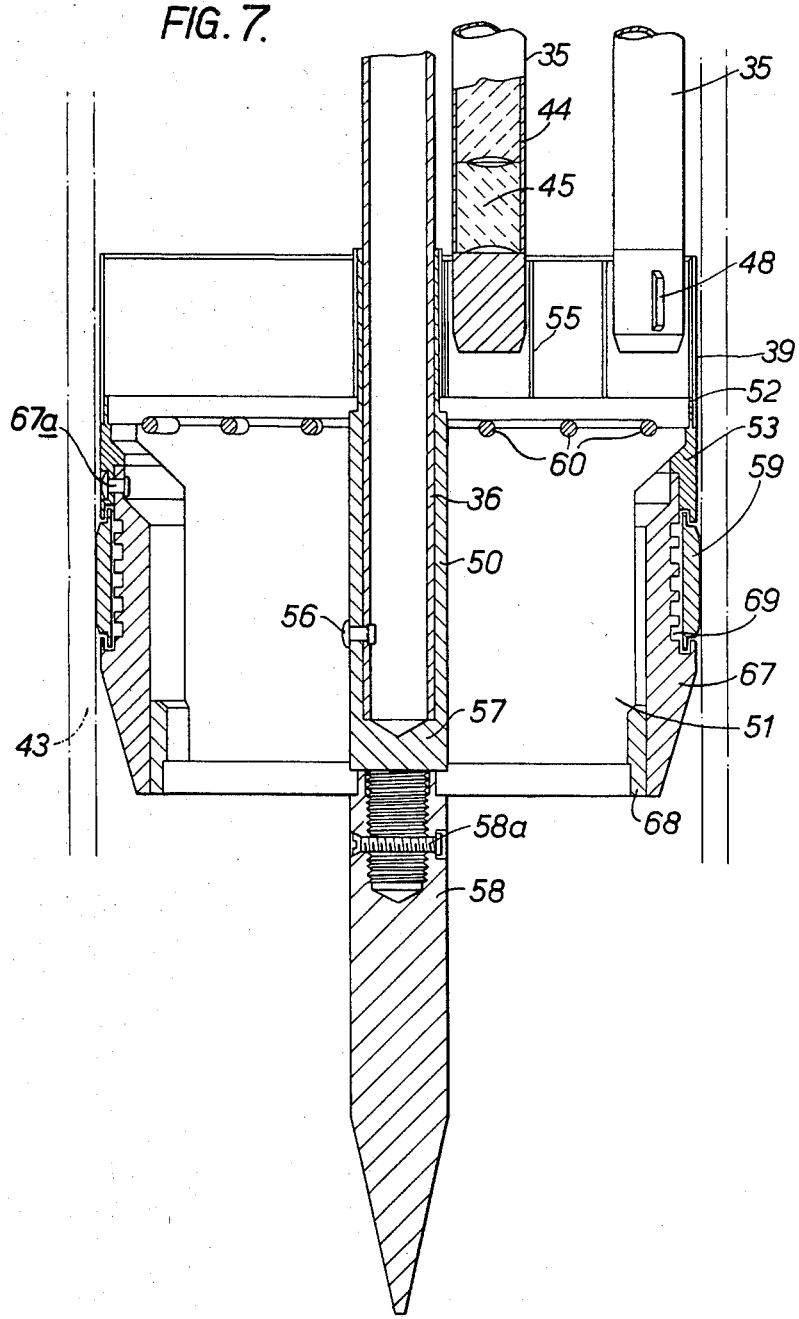
Figure 8:
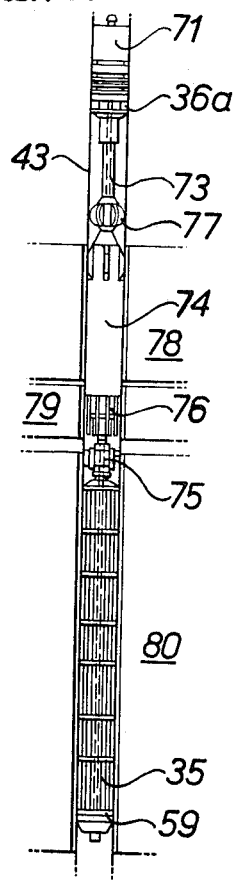

Constructional embodiments of the invention will now be described, by way of example, with reference to the accompanying drawings wherein:

FIG. 1 is a fragmentary sectional side view of a vertical tube in construction of nuclear reactor,
FIG. 2 is a fragmentary side view of a nuclear fuel assembly for a second construction of nuclear reactor,
FIG. 3 is a plan view in section on line III—III of FIG. 2 drawn to a larger scale,
FIG. 4 is a plan view,
FIG. 5 is a view in the direction of the arrow designated IV in FIG. 2,
FIG. 6 is a fragmentary view in section on line VI—VI of FIG. 3,
FIG. 7 is a fragmentary side view in section on line VII—VII of FIG. 5,
FIG. 8 is a fragmentary diagrammatic side view in section of the second construction of nuclear reactor core.

In FIG. 1 there is shown part of a construction of a nuclear reactor comprising a liquid (heavy water) moderator contained in a calandria tank 1 penetrated by the vertical zirconium alloy pressure tube 2. A nuclear fuel assembly shown in broken line lesignated 3 and which is approximately 30 feet long is suspended within the pressure tube 2 from a closure member (not shown) for the upper end of the tube. The lower end of the assembly is free and there is a radial clearance between the assembly 3 and the wall of the tube 2. The fuel assembly 3 is immersed in light water which flows upwardly in the tube and is boiled by heat exchange with the fuel assembly; a mixture of steam and water flows out of the upper end of the pressure tube. A tubular member 20 is detachably secured at its lower end to the pressure tube and at its upper end has a collar 4. The tubular member and its collar are slit to form a plurality of resilient fingers 32 and the peripheral surface of the collar is in contact with the wall of the tube 2. The free end of the fuel assembly 3 is encircled by the collar 4 with a radial clearance between the assembly and the collar. The clearance C between the assembly 3 and the pressure tube is greater than the clearance between the assembly 3 and the collar 4 so that, although the free end of the assembly has substantial freedom of movement, the assembly is prevented from contacting the wall of the pressure tube. When the fuel assembly is being lowered into the pressure tube the radial clearance between the free end and the collar enables the free end to be entered into the collar easily; during operation of the reactor the free end has freedom of movement without causing damage to the wall of the pressure tube by vibrational chatter of the assembly.

The calandria tank $k$ surmounts two neutron shield tanks 6, 7 containing light water and is itself surmounted by two similar neutron shield tanks (not shown in FIG. 1). The pressure tube 2 passes through tubular passages in the neutron shield tanks and calandria tank and is supported from the upper shield tank by a flanged support (not shown in FIG. 1). The pressure tube 2 consists of three sections joined end to end, the center section 8, which extends between the upper and lower ends of the calandria vessel, is of zirconium alloy while the other end sections 9 (only the lower end section being shown) are of stainless steel. The sections are joined together by roll swaged joints as shown at 10. In order to support the pressure tube against bending in the region of its lower roll swaged joint, a thimble tube 11 secured to the lower face of the lower shield tank 7 extends upwardly and has internal annular ribs 11a which slidably engirdle an enlarged end of the lower end section 9 of the pressure tube.

An end section 9 of the pressure tube has a taper seating 21 and an internal shoulder 22 which serve to secure the tubular member 20 in the pressure tube by engagement of its lower end. The lower end of the tubular member 20 is slit to define six resilient fingers 23. The fingers 23 have external tapers 24 complementary to that of the socket 21 and have external shoulders 25 in abutment with the internal shoulder 22.

Three of the resilient fingers 23 have fingers clips as shown at 26 attached by screws 26a and a locking ring 27 is arranged to be slidable along the tubular member 20 to be retained by the clips 26 in a position such that the resilient fingers 23 are prevented from being deflected inwardly to release the tubular member 20 from the seating 21. The locking ring 27 has an internal recess 28 for engagement by retaining pads 29 formed on the finger clips and also has six internal lips 30 for engagement by a releasing tool (not shown) which can be lowered within the pressure tube to effect withdrawal of the tubular member.

A guide pin 31 is provided to co-operate with the tool (not shown) for releasing the tubular member 20. The free ends of the fingers 32 have pads 33 formed thereon which are arranged resiliently to grip the inner wall of the pressure tube. The fuel assembly has an annular pad 34 attached to its lower end which is slidably guided within the tubular member 20 by the fingers 32 the pad being of such diameter that in combination with the collar 4 it affords a diametral clearance of approximately .040" on a nominal internal diameter of 4.25". The nominal diametral clearance C between the pressure tube wall and the fuel assembly at its largest diameter is .070" so that a clearance between the pressure tube wall and the fuel assembly of approximately .015" is assured. The diametral clearance of approximately .040" between the pad 34 and the tubular member 20 ensures that even with adverse manufacturing tolerances the pad can easily be entered into the tubular member during loading of the long and slender fuel assembly into the pressure tube. Since the fingers 32 are always in contact with the pressure tube wall the wall is protected from damage; wear due to vibrational contact is shared between the fingers 32 and the pad 34.

In the event of necessity to replace the tubular member 30 a releasing tool is lowered within the pressure tube, through the tubular member and is orientated by engagement with the pin 31. On subsequent rotation of the tool through 60° followed by withdrawal, projections on the tool are arranged to engage the lips 30 of the locking ring 27 followed by lifting of the locking ring to a position in abutment with the pin 31. On further withdrawal of the tool six tapered projections at the lower end of the tool engage the resilient fingers 23 and deflect them inwardly so that continued withdrawal of the tool effects removal of the tubular member from the socket 21.

In a second construction shown in FIGURES 2 to 8 inclusive there is shown part of a nuclear reactor pressure tube containing a suspended nuclear fuel assembly comprising a cluster of sheathed fuel rods 35. Mounted on the free lower end of the assembly there is a collar constituted by a stainless steel split ring 59. The split ring 59 resiliently engages the pressure tube wall (shown in broken line and designated 43) and serves as a buffer between the unsupported end of the fuel assembly and the wall of the pressure tube. The ring 59 (which is split at one circumferential place 59a) is retained by a stainless steel skirt 67 defining the lower end of the assembly. The skirt 67 has a group of five annular grooves 69. The diameter of the lands between the grooves and the bore of the ring 59 are arranged to be such that they afford a diametral clearance of approximately .040". The nominal diametral clearance between the pressure tube wall and the fuel assembly at its largest diameter is .070" so that clearance between the pressure tube wall and the fuel assembly of approximately .015" is assured. The diametral clearance of .040" ensures that the fuel assembly with split ring 59 can freely pass down the pressure tube during loading of a fuel assembly and since the ring is always in contact with the pressure tube wall any wear due to vibrational contact is shared by the lands of the grooves 69 and the split ring.

The cluster includes a total of thirty-six fuel rods 35 arranged on three concentric pitch circles about a central tube 36 (FIGURE 6) having side apertures 37. The fuel rods are end supported by a plate 38 and a grid 39, the rods being secured to the plate 38 by bolts 40 as shown in FIGURE 4 and being slidably guided by cells in the grid 39 so as to compensate for thermal expansion of the rods. The fuel rods are spaced by eleven bracing grids 41 disposed along the length of the cluster at 12½" intervals. The assembly shown in FIGURE 2 is adapted by a screw thread connection 42 to be attached to a coupling member 75 by which the assembly is suspended within the pressure tube 43 as shown in FIGURE 8.

The fuel rods are 12 feet 9¼" long and ⅝" outside diameter and each comprise a zirconium alloy tube 44 containing a stack of pellets 45 of uranium dioxide enriched in the isotope U-235. The stack of pellets is consolidated by a compression spring 46 disposed within a void 47 at the end of the rod adjacent the plate 38. Wear pads 48 of zirconium alloy are attached to each tube 44.

The grid 39 is carried by an annular member 53 which is attached to a central tubular member 50 by six webs 51. The member 53 has a spigot 52 to which the grid 39 is secured by spot welds 54 shown in FIGURE 2. The skirt 67 is secured to the member 53 by rivets 67a and is located concentric with the assembly by a ring 68 attached by the webs 51 to the tubular member 50. The grid 59 is made from stainless steel strip and has thirty six ferrules 55 arranged to be penetrated by the fuel rods 35. The fuel rods slide within the ferrules 55, the tube 44 being spaced from the ferrules by wear pads 48. The tubular member 50 embraces an end of the central tube 36 of the assembly and is secured thereto by a rivet 56. A blind end 57 of the tubular member 50 has a tapered spike 58 secured by a screw thread and a pin 58a. Three concentric wire rings 60 have diameters equal to the pitch circles of the rods and are supported by the edges of the webs 51. The plate 38 to which the fuel rods are secured has apertures 61 as shown in FIGURE 4.

The transverse bracing grids 41, one of which is shown in FIGURE 3, are fabricated from stainless steel strip and each comprises thirty six ferrules 62 contained within a peripheral rim 63. The ferrules have internal diameter .700" and are arranged in concentric circles coincident with the fuel rods 35. Small split tubular members 64 and six radial ribs 49 are provided to add rigidity to the structure. The grid has a central ferrule 65 which is threaded on to the central tube 36 of the assembly and is secured thereto by rivets 66 as shown in FIGURE 6.

In use coolant flow is through the grid 39 and along the cluster, through the transverse bracing grids 41 and thence through the apertures 61 in the plate 38.

In the event of fracture of a fuel rod during operation of a nuclear reactor core, the wire rings 60 serve to prevent free fall of fragmentary fuel rod through the grid 39 into the lower end of a fuel element channel of the reactor. The tube 36 is connectable by a pipe designated 36a in FIGURE 8 to an emergency water supply so that in the event of an emergency such as would be caused by breach of the coolant circuit of the reactor resulting in loss of coolant in the fuel element channels as defined by the pressure tubes, emergency water can be conducted to the cluster of fuel rods and thence to spray from the side apertures 37 of the central tube on to the fuel rods. The annular grooves 69 in the skirt 67 serve to collect crud formed in the water and which would otherwise coat the skirt 67 and the bore of the ring 59 thereby reducing the effective annular clearance therebetween.

In FIGURE 8 the fuel assembly (which is approximately 30 feet long) is shown also to include a closure plug 71 for the pressure tube 4. The cluster of fuel elements 35 is suspended from the closure plug by a tubular tie member 73 to which it is attached by a coupling 75. A neutron shield plug 74 is disposed intermediate the closure plug 71 and the coupling 75 and it has two stabilising devices 76, 77. The pressure tube extends through upper main and auxiliary biological shield tanks 78, 79 and a calandria vessel 80.

We claim:
1. A nuclear reactor having a plurality of vertical pressure tubes for conducting fluid flow, a resiliently contractible collar in at least one of said pressure tubes and having its peripheral surface in unattached contact with the wall of said pressure tube, a fuel assembly housed in said tube with radial clearance between said assembly and said tube, said assembly being supported against gravity at one end and free at the other end, the free end being encircled by said collar with radial clearance between said assembly and said collar, said clearance between said assembly and said tube being greater than said clearance between said assembly and said collar.

2. A nuclear reactor according to claim 1, wherein said collar is carried by a tubular member and said tubular member is detachably secured to said pressure tube.

3. A nuclear reactor according to claim 2, wherein said collar is formed integrally of said tubular member, and said collar and said member are slit longitudinally to provide a plurality of resilient fingers.

4. A nuclear reactor according to claim 1, wherein said collar is carried on said free end of said assembly.

5. A fuel assembly for a nuclear reactor according to claim 4, wherein said collar is a ring split at one circumferential part.

References Cited

UNITED STATES PATENTS

| | | | |
|---|---|---|---|
| 2,926,127 | 2/1960 | McCorkle | 176—64 |
| 3,175,957 | 3/1965 | Costes et al. | 176—43 |
| 3,226,301 | 12/1965 | Bernard et al. | 176—64 |
| 3,240,677 | 3/1966 | Kunzli | 176—64 |
| 3,249,505 | 5/1966 | Laurent et al. | 176—43 |

FOREIGN PATENTS 1,368,511  6/1964  France.

BENJAMIN R. PADGETT, *Primary Examiner.*

H. E. BEHREND, *Assistant Examiner.*

U.S. Cl. X.R.

176—40, 64, 87